May 8, 1962 J. A. BROWNING 3,033,292
HIGH ENERGY ATOMIZER FOR FIRE EXTINGUISHMENT
Filed Jan. 27, 1960

INVENTOR
JAMES A. BROWNING

ATTORNEYS

3,033,292
HIGH ENERGY ATOMIZER FOR FIRE EXTINGUISHMENT
James A. Browning, Norwich, Vt.
(213 Mechanic St., Lebanon, N.H.)
Filed Jan. 27, 1960, Ser. No. 5,057
3 Claims. (Cl. 169—2)

This invention relates to the suppression of fires by a novel technique wherein large quantities of water are transformed into fine particles of fog size. It has been found desirable in many types of fire fighting to use a suspension of such fog-size particles. This invention provides a means for producing small water droplets in quantities which hitherto have been considered impossible.

Fires may be extinguished in several different ways. Consider the use of water. Water has a high heat of vaporization and under proper conditions is capable of suppressing a fire by a cooling action. Such cooling effect can either act on the reacting gases themselves to lower their temperature below the ignition point, or on the material supplying one or more of such reactants. An example of the latter case is represented by the conventional technique of fire fighting where extremely large streams of water are directed into the combusting region. The water impacts against the burning solid material (for example a wooden frame dwelling) cooling said material to a temperature which will no longer provide the reactants feeding the flame itself.

In addition to the cooling of the reactant gases and/or the solid materials providing such reactants, a third method of fire suppression results from the displacement of the oxidizing gas by the steam formed from the vaporization of the water.

It is important to note that the effectiveness of each of these three modes of fire suppression depends on the type of fire being fought. Although a solid surface such as wood is satisfactorily fought by solid streams of water, such streams are relatively ineffective in fighting many other types of fires. Flames forming above a liquid surface are difficult to extinguish by this means. A more effective technique is to disperse the water into a spray of fine particles. A large surface area is presented by such a geometry, and the suspension is capable of absorbing heat at many times the rate of the single stream. Ideally, these liquid particles are vaporized within the flame region itself cooling the reactants below their ignition point. In addition, a large quantity of steam is formed which tends to dilute the amount of oxidizer available to the flame. In the limit, the percentage of air in the combusting mixture may be reduced to a point where continued ignition is impossible. The use of such suspension of water droplets is finding increasing use and is commonly referred to as "fog."

Fog, or fine suspensions of water droplets, is commonly produced by ordinary spray-type nozzles in many ways similar to oil atomizing equipment as used in domestic oil burners. A second method involves the impacting of two or more high velocity streams of water. A major limitation of the spray nozzle method is the low momentum of the resulting suspension. It is desirable to have a stream (particles plus carrier gas) of sufficient momentum to penetrate well into the flame region. It frequently happens that the spray particles, lacking proper momentum, rise over the flame in the hot gases produced by the flame. In such a case this method can be ineffective.

A disadvantage of the spray formed by multiple-stream impingement rests in the coarseness of the particles formed. It is not possible to produce the fine droplets desired for optimum results by this method.

The present invention is capable of producing high rates of liquid atomization to form fine particle suspensions. In addition, high momentum values are provided allowing for the projection of the suspension over relatively long distances. The basic operation consists of burning a fuel with an oxidizer within a confining chamber to form a high velocity discharge jet of combustion gas which issues from the chamber through a nozzle orifice. A portion of the kinetic energy of this jet is used to atomize water into fine droplets. These droplets are carried forward and into the flame region by the high velocity gaseous jet. Such a system provides an extremely effective means for fighting many types of fires.

The structure, functions, and advantages of my internal burner atomizer unit will be more apparent from the following description made in connection with the accompanying drawings, wherein.

Figure 1:
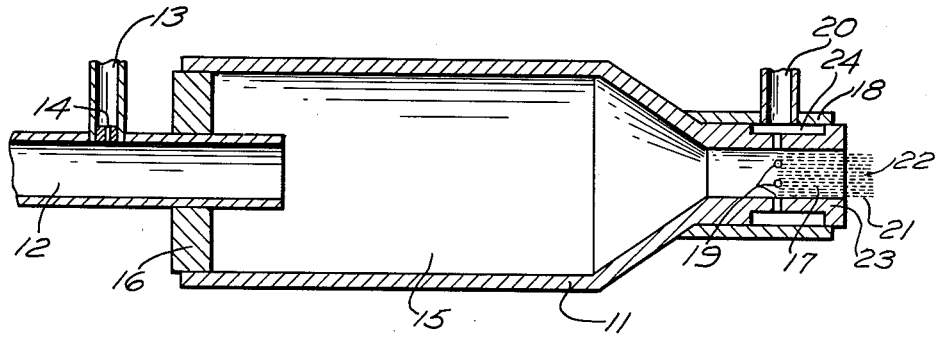
FIGURE 1 is a longitudinal sectional view of a burner designed for the practice of my invention.

The use of such internal burners for fire fighting equipment can better be understood by reference to the drawings. FIGURE 1 is a longitudinal sectional view of an uncooled internal burner in which water is introduced into the exhausting gaseous jet. In this case the oxidizing gas is air, although other oxidizers including pure oxygen may also be used. The air is supplied under pressure into the chamber 15 in the burner 11 through a tube 12 which enters through an end wall 16 of the burner. Fuel oil or any other common fuel such as propane, is supplied through a pipe 13 which enters the pipe 12, a constricted orifice 14 being located in the pipe 13 at the junction with the pipe 12. The fuel from the pipe 13 mixes with the air stream in the pipe 12 and flows therewith into the chamber 15 where combustion occurs. The products of combustion expand to the atmosphere from the chamber region of elevated pressure through the discharge end of the burner which is reduced in diameter to form a nozzle 23 having a discharge passage 17. A circumferential channel 24 is provided in the outer surface of the nozzle 23 and a sleeve 18 is fitted on the nozzle form with the channel 24 an annular duct for the passage of water from a supply pipe 20 which opens through the sleeve 18 to the nozzle passage 17 with which the channel 24 communicates through a number of small holes 19. For maximum water flows it is desirable to deliver the water under pressure to the burner nozzle section.

The holes 19 provide the means for the water to discharge with a sufficiently high radial component of velocity to penetrate the high velocity jet of combustion gases. The jet action effectively atomizes the water streams to form a fine suspension of water particles within the discharging gaseous jet.

Since the purpose of this device is to provide liquid for fire fighting, the water flow rate to the unit must be sufficiently high to preclude the formation of substantial quantities of steam. Under the operating conditions shown in Table I the water gaseous jet combination has an average mixture temperature only slightly higher than that of the entering water.

TABLE I

*Typical Performance Data*

| | |
|---|---|
| Air consumption | 12,000 standard ft.³/hr. |
| Oil flow | 10 gals./hr. |
| Water flow (60° F. inlet) | 6,000 gals./hr. |
| Discharge temperature | 85° F. |

Thus, under adequate water flow conditions the internal burner may be used simply as an atomizer-projector, the discharging mixture having no resemblance to that of the burner when operated without the water injection.

For certain purposes compressed air can be used for producing water sprays. It has been found, however, that under normal conditions of temperature and pressure (70° F. and 100 p.s.i.g.) the highest velocity obtainable in a jet of air forced through a convergent nozzle is about 1,100 ft./sec. In situations where substantially greater velocities are required, heat can be employed to increase the energy in the stream approximately eight-fold with a resultant jet velocity of 2500 ft./sec. It is this high kinetic energy which allows the burner system to atomize many times the water flow in comparison with compressed air alone. In addition, the higher jet momentum provides better penetration of the jet mixture into the flame region.

Figure 2:
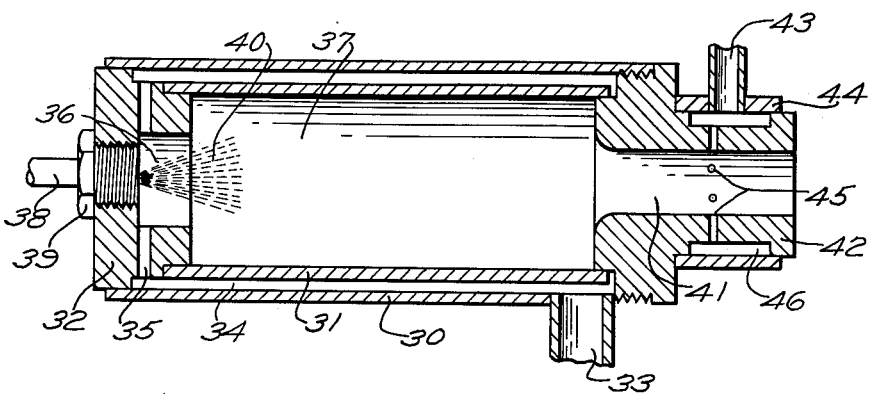
FIGURE 2 is a longitudinal sectional view of a second burner for the same purpose.

FIGURE 2 shows another embodiment of my invention. In this case the burner is effectively cooled by the air supplied for combustion. Such air enters the burner through tube 33 to be distributed into the annular volume 34 contained between a jacket 30 and a combustion tube 31. This air flows towards the end wall 32 of the jacket, cooling the combustion tube 31. The air next passes through the radially disposed holes 35 to mix with the fuel spray 40 which enters from a supply pipe 38 through a nozzle 39 in the end wall 32. Ignition and combustion take place in the chamber 37 within the combustion tube 31. The products of combustion issue through a nozzle 41 in the end piece 42.

The fuel (in this case oil) is delivered under pressure to the chamber 37 through the pipe 38 and the nozzle 39. The water to be atomized enters the annular space 46 between the nozzle piece 42 and the sleeve through a tube 43. Multiple holes 45 from the space 46 to the nozzle passage inject the water into the high velocity gaseous stream issuing through this nozzle passage.

Figure 3:
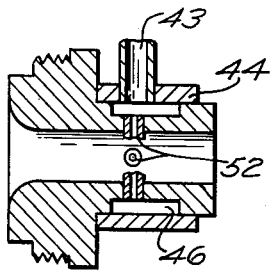
FIGURE 3 is a sectional view of a modified form of the nozzle shown in FIGURE 2.

FIGURE 3 shows a second arrangement for the injection of the water into the high velocity gaseous jet. A number of tubes 52 project radially into the gaseous stream to provide for better penetration of the water into said stream. This arrangement is particularly useful for large burners when the water must penetrate a greater distance to mix evenly in the gaseous stream.

The mixture issuing from the nozzle is composed of atomized water and the products of combustion cooled to the temperature of the water droplets. This mixed stream has an extremely high momentum, and the fog particles are forcefully carried horizontally over 100 feet. Such a stream is easily directed into the critical combustion areas at minimum hazard to the operator.

Figure 4:
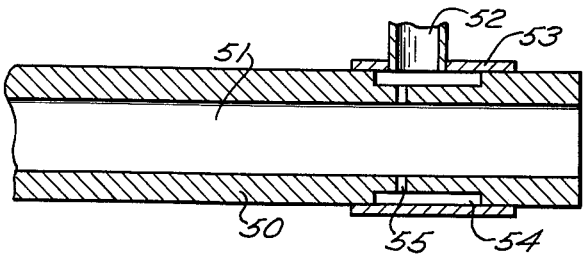
FIGURE 4 is a sectional view of the discharge end portion of a steam pipe with means for supplying water thereto.

An alternate technique, whereby heat energy is used to produce a high velocity jet to be used to atomize the water, consists of a high pressure steam system. Water is converted to steam in a boiler and the steam is delivered to an atomizer unit 50 (see FIGURE 4) at a pressure of about 100 p.s.i.g., or higher. The steam travels at high velocity through the passageway 51. Water is introduced to the atomizer unit 50 from a supply pipe 52 through an annular passage 54 enclosed by a sleeve 53 on the unit 50 and a series of radial holes 55.

It is to be understood that this invention relates to the increase in kinetic energy of common types of jet devices by the use of heat energy. The description of the various devices as shown in the figures is by way of illustration and not intended to limit the scope of the invention. In many cases different injector configurations may be desirable. For instance, the use of a venturi section (at which throat the water would be introduced to the compressible fluid flow) is often beneficial.

The apparatus of this invention is applicable not only for fire fighting but for general spraying uses such as the spraying of trees.

I claim:

1. A method of forming a high-velocity jet of aqueous fog which comprises forming a high-velocity jet of combustion gases and entraining in said gaseous jet sufficient quantities of water to avoid the production of any appreciable quantity of steam within the jet, and discharging said jet of gases and entrained water droplets at velocities of the order of 2500 feet per second.

2. A method of forming a high-velocity jet of aqueous fog which comprises supplying fuel and an oxidizer to a combustion chamber having a reduced outlet to maintain an elevated pressure in said chamber and a high velocity stream of combustion gases through said outlet, and injecting into said stream near said outlet water in sufficient quantity to avoid the formation of any appreciable amount of steam in said stream, and projecting said stream from said outlet at velocities of the order of 2500 feet per second.

3. A method of fire-fighting which comprises feeding fuel and oxygen into a combustion chamber to support combustion therein at an elevated pressure, discharging the resultant combustion gases through a reduced outlet in a gaseous stream at velocities of the order of 2500 feet per second, introducing into said stream at a point near said outlet water in sufficient quantity to avoid the formation of any appreciable amount of steam, whereby the water is atomized into a fog of fine droplets, and directing the stream of mixed gas and fog into a flame to be extinguished.

References Cited in the file of this patent

UNITED STATES PATENTS

| | | |
|---|---|---|
| 2,051,125 | Bacon | Aug. 18, 1936 |
| 2,259,501 | Smith | Oct. 21, 1941 |
| 2,450,537 | Williamson | Oct. 5, 1948 |
| 2,586,025 | Godfrey | Feb. 19, 1952 |
| 2,648,196 | Mullen II et al. | Aug. 11, 1953 |
| 2,961,050 | MacCracken | Nov. 22, 1960 |